(Model.)
W. P. AUSTIN.
Sewer Trap.
No. 230,685. Patented Aug. 3, 1880.
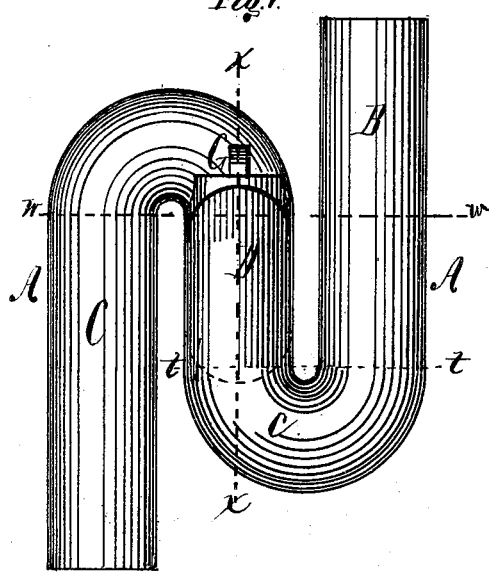
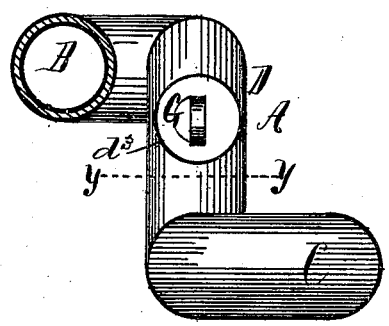
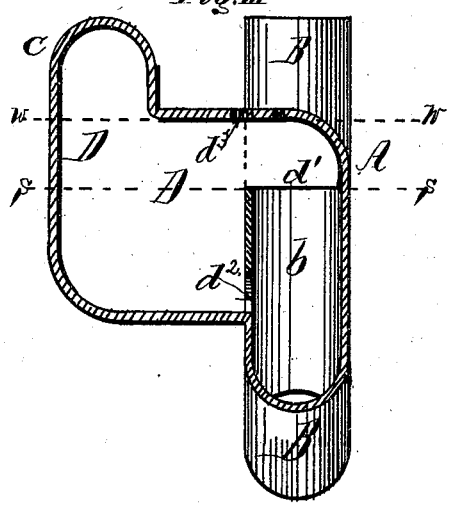
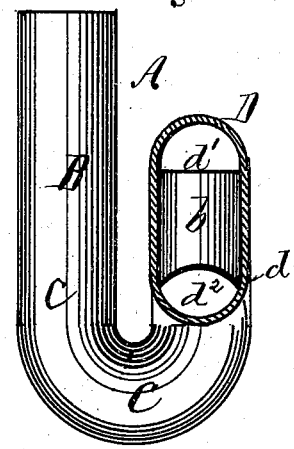
Witnesses:
Inventor:
William P. Austin
Per: Richard Gerner
Att'y.

UNITED STATES PATENT OFFICE.

WILLIAM P. AUSTIN, OF NEW YORK, N. Y.

SEWER-TRAP.

SPECIFICATION forming part of Letters Patent No. 230,685, dated August 3, 1880.

Application filed June 22, 1880. (Model.)

*To all whom it may concern:*

Be it known that I, WILLIAM P. AUSTIN, of the city of New York, in the county of New York, and State of New York, have invented new and useful Improvements in Sewer-Traps; and I hereby declare that the following is a clear and exact description of the same, reference being had to the accompanying drawings, forming a part of this specification.

The object of my invention is to prevent sewer-traps from becoming siphoned or emptied of their contents or sealing-water by an induction-current or flow of air and water down the main soil or waste pipe.

The nature of the invention will be readily understood by reference to the accompanying drawings, of which Figure I is a side view of my improved sewer-trap. Fig. II is a plan view. Fig. III is a sectional view on line $x\ x$, Fig. I. Fig. IV is a sectional view on line $y\ y$ of Fig. II.

A is a sewer-trap, consisting of the inlet-pipe B and outlet-pipe C, which are joined together at $c$ by a receiver or reservoir, D. The end $b$ of the inlet-pipe B protrudes through the receiver or reservoir D at $d$ as high as point $d'$. (See Fig. III.) $d^2$ is an opening in pipe B, communicating with reservoir D.

G is a screw, serving as a trap-screw for covering the hole $d^3$ in the top of the reservoir D required for cleaning the same.

When the trap is in a proper condition the sealing-water will be on the line $w\ w$.

When an induction-current is created in the outlet-pipe C (which is connected to the main drain-pipe) by the fall of waste water down the main waste-water pipe, only a part of the sealing-water in the reservoir D and inlet-pipe B rushes out into the outlet-pipe C, instead of all the water, as now takes place in the commonly-used sewer-traps.

It will be observed when an induction-current is produced only so much sealing-water escapes as is required to cause the air to enter into the reservoir D through the top of the pipe B. The water will then sink to a level with the top of this pipe or to the line $s\ s$, as shown in Fig. III, and below this point the sealing-water will remain in the reservoir. In this case there is always sufficient sealing-water left in the reservoir below line $s\ s$ to fill the lower end, $c$, of pipe B. When the partial vacuum is destroyed this remaining sealing-water in reservoir D rushes through opening $d^2$ into the lower end, $c$, of the inlet-pipe B and completely seals it again, and thus prevents the escape of gas through the trap.

Having thus described my invention, I desire to claim—

The reservoir D, in combination with the outlet-pipe C and inlet-pipe B, having the openings $d'$ and $d^2$, and projecting into the reservoir to a point, as shown at $d'$, for the purpose set forth.

WILLIAM P. AUSTIN.

Witnesses:
 F. BARRITT,
 CH. RIEGELMAN.